July 16, 1957 — W. B. JOHNSON — 2,799,359

CONTACTING SOLIDS AND GASES

Filed Aug. 31, 1950 — 3 Sheets-Sheet 1

INVENTOR.
WILLIAM B. JOHNSON
BY E. F. Liebrecht
G. N. Palmer
ATTORNEYS

July 16, 1957 W. B. JOHNSON 2,799,359
CONTACTING SOLIDS AND GASES
Filed Aug. 31, 1950 3 Sheets-Sheet 2

INVENTOR.
WILLIAM B. JOHNSON
BY E. F. Liebrecht
G. S. Palmer
ATTORNEYS

July 16, 1957 W. B. JOHNSON 2,799,359
CONTACTING SOLIDS AND GASES
Filed Aug. 31, 1950 3 Sheets-Sheet 3

INVENTOR.
WILLIAM B. JOHNSON
BY E. F. Luebrecht
D. W. Palmer
ATTORNEYS

United States Patent Office 2,799,359
Patented July 16, 1957

2,799,359

CONTACTING SOLIDS AND GASES

William B. Johnson, Far Hills, N. J., assignor to The M. W. Kellogg Company, Jersey City, N. J., a corporation of Delaware Application August 31, 1950, Serial No. 182,470

17 Claims. (Cl. 183—114.2)

This invention relates to improvement in contacting gases and vapors with solid contact materials. In particular, the invention relates to improvements in contacting gases and vapors with granular solids whose granule size is such that a settled, or downwardly flowing, mass of such granules is sufficiently porous to permit the flow of the gas or vapor through the mass without excessive pressure drop.

The treatments which may be carried out by such contact of gas and vapor with granular solids include: heat exchange between the gas and the solid; catalytic reactions involving a gaseous reactant or involving a solid contact agent, catalyst, or reactant; thermal conversion treatment of hot solids; combustion of carbonaceous material on the surfaces of granular solids; distillation of liquids contained in granular solids; adsorption treatment of gases and vapors by solids.

The use of contact material in the form of granular masses which are permitted to flow downwardly by gravity through the contact zone permits continuous, or substantially continuous, passage of the contact material through the zone. This permits continuity of operation in respect to the gas or vapor, also, since continuous withdrawal and replacement of contact material provides in the contact zone a mass of contact material of substantially unchanging average composition. This method of operation also affords the operator a choice of flowing the gas or vapor downwardly concurrently with the granules of solid, or upwardly in a countercurrent direction, or laterally across the moving bed of solids. The downward movement of the solids in the contact zone may be continuous, as the result of continuous withdrawal of solids from the bottom of the contact zone, or only substantially continuous, as the result of withdrawal of increments of the granular mass at suitable intervals. The field of application of this invention includes all such substantially continuous operations in which a portion, only, of the granular mass, is withdrawn, this being done continuously or intermittently.

The granular solids withdrawn from the bottom of the contact zone are subjected to suitable treatment to make them suitable for reuse and are reintroduced into the top of the same or a similar contact zone. Whatever the treatment, the granules must at some stage of the process be lifted from the level of the contact zone to at least the level of the top of the contact zone.

The principal present application of the above-described process is in the catalytic conversion treatment of hydrocarbon oils, such as the catalytic cracking of gas oil or reduced crude oil to form gasoline. The present invention is applicable to such treatments as well as to other hydrocarbon conversions and chemical treatments in general, such as reforming of naphtha, coking of hydrocarbon oils, desulfurization of hydrocarbon vapors, adsorption treatment of natural gas to separate high boiling components, oxidation of hydrocarbons wherein the solid is a catalyst and/or a supplier of oxygen for the reaction, and distillation and/or gasification of coal or shale.

In the catalytic conversion of hydrocarbons, the granular solids withdrawn from a contact zone may be lifted to the top of an adjacent contact zone in which revivification or regeneration treatment is applied to the solids, following which the regenerated solids are lifted again to the top of the first-mentioned contact zone. Alternatively, the zones may be mounted at a different level whereby the solids emerging from the upper zone flow by gravity into the lower zone, and in that operation it is necessary to lift the solids emerging from the bottom of the lower zone to the substantially high elevation formed by the combined heights of the two contact zones.

These operations have certain disadvantages in the regulation of the rate of withdrawal of solids from the lower zone and in the lifting of the solids to again pass them through a contact zone. The relatively large size of the granules causes irregularities in the rate of flow of the solids through any orifice, so that control of such rate is difficult. The lifting of the withdrawn solids has been carried out in mechanical elevators. Such equipment is expensive and its physical limitations impose an upper limit on the ratio of solids to vapors charged to the contact zone which seriously limits the applicability of the process. It is proposed, also, to lift the granules to the high elevation by suspending them in a gas stream flowing upwardly to the desired elevation. This is disadvantageous in respect to the high velocity of the gas stream, the volume of gas required, and the resulting attrition of the granules.

It is an object of this invention to provide an improved process in which the granular solids withdrawn from the bottom of the contact zone are lifted to a high elevation without the use of mechanical elevators and by means of a lesser quantity of gas at lower velocity than in methods previously suggested. It is a further object of the invention to provide a method for handling the solids being withdrawn from the bottom of the contact zone which permits greater control of the rate of withdrawal. It is a further object of the invention to provide an improved method of handling such withdrawn solids whereby they may be more easily moved from the bottom of a contact zone to a zone of higher pressure preparatory to being elevated to a higher elevation, while minimizing erosion and maintaining a more positive seal on the zone.

The invention will be described by reference to the accompanying drawings which are diagrammatic representations in elevation of various arrangements of apparatus for carrying out various modifications of the invention. It will be understood that the invention is not limited in scope to the modifications thereof which may be carried out in the apparatus illustrated, but includes in its scope other modifications, embodying the principle of the invention, which may be beyond the physical limitations of the apparatus illustrated.

Figures 3–8 are simplified diagrammatic illustrations of further modifications of the systems shown in Figures 1 and 2.

Figure 1:
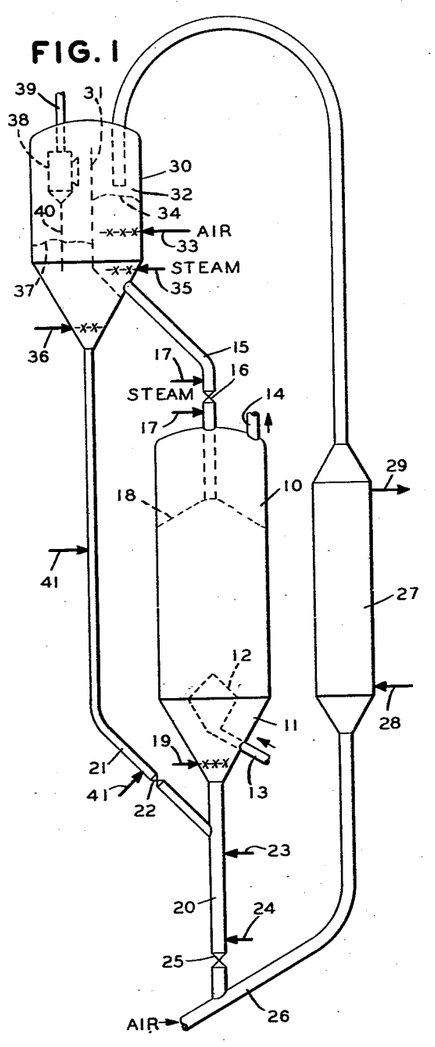
Figure 1 represents, in diagrammatic elevation, a contact system, which may be a catalytic reaction system, in which the contact material is treated, after removal from the contact zone, to effect regeneration thereof while being lifted to a point from which it can be discharged into the top of the contact zone.

In Figure 1 a vertical contact chamber 10 is provided which, conveniently, may be cylindrical in horizontal cross-section and arranged to contain a mass of granular solids which moves downwardly, continuously or intermittently. Reactor 10 may be constructed, and provided with auxiliary equipment for handling solids and introducing and withdrawing contact gases or vapors, in any of the various ways known to those skilled in the art. Conveniently, the bottom section may be conical in shape as indicated at 11 and may be provided with any suitable distributor 12 for distributing through the granular mass the gas or vapor introduced through line 13. This arrangement, together with the provision of a gas or vapor outlet at the top of the chamber at 14, provides for flowing the gas upwardly and countercurrently to the downflowing solids. It will be understood that this illustrates one method of operation and that the improved process includes within its scope the flow of the gas through the granular mass downwardly or laterally.

The granular solids are discharged into the top of chamber 10 through line 15, which is provided with a control valve 16, and penetrates downwardly into chamber 10 a substantial distance, as shown, to maintain a clear space in the chamber above the granular mass. A relatively inert gas or vapor, such as steam, may be introduced on each side of valve 16, through lines 17, to seal line 15 against the passage of gas or vapors out of chamber 10 through line 15. The solids discharged into chamber 10 from line 15 form a granular mass whose upper level, indicated diagrammatically at 18, is largely controlled by the downward extension of line 15 in chamber 10.

The granular mass in chamber 10 should be sufficiently porous to permit the passage of the vapors therethrough without excessive pressure drop and without undue agitation of the bed. For that reason, it is desired, for most uses, to employ solid particles having average diameters ranging from 0.5 millimeter to 10 millimeters. The mass employed may consist of particles varying substantially in size, or the mass may consist of particles of substantially uniform average diameter. They may be prepared by any suitable method, such as pelleting, crushing, or bead forming.

The materials employed in the granules in chamber 10 depend, necessarily, on the treatment to be carried out therein. They include charcoal (for absorption treatments); coke (for coking and absorption treatments); silica gel and alumina gel (for absorption and drying treatments); clays (for a variety of contact operations, including catalytic conversions); synthetic siliceous materials, such as silica-alumina and silica-magnesia complexes (for hydrocarbon cracking and polymerization reactions); base materials, such as alumina, in combination with minor amounts of catalytic materials (for carrying out a variety of catalytic reactions, such as hydroforming, hydrogenation, desulfurization, etc.); and reducible metal oxides (for supplying oxygen to an oxidation reaction).

The solids are introduced, and withdrawn from, chamber 10 continuously or intermittently in the known manner, at a rate which meets the requirements of the contact treatment being carried out. The downflowing granules flow past distributor 12 and are collected in cone 11 at a point below the distributor for withdrawal from chamber 10. If the treatment in chamber 10 involves the formation of vapors which it is desired to retain with the products withdrawn through line 14, or which it is desired to exclude from further treatments of the solids, a stripping medium, such as steam, may be introduced into the cone 11, as through line 19. This inert stripping gas or vapor flows upwardly through the interstices of the mass of granules below distributor 12 to clear from such interstices the vapors which it is desired to remove from the granules. The granules thus stripped of vapors are withdrawn from the bottom of chamber 10 through the apex of cone 11 and are introduced into a vertical pipe 20 for transmission to another part of the system.

As the granular mass emerges from the bottom of chamber 10, the granules thereof are mixed with more finely-divided solid material of the same or different chemical and physical properties as the granules supplied through line 21 provided with a control valve 22. The finely-divided solid material thus mixed with the granular material may comprise particles having a wide variety of average diameters which may range from 1 to 100 microns. Pipe 21 may be connected to pipe 20 at a point just below cone 11, as shown, whereby the mixing of the granules and powder is effected at that point. However, by suitable connection of pipe 21 the powder may be mixed with the granular material in the bottom of the cone 11, or the mixing may be deferred until the granular solids have flowed downwardly through pipe 20 for a suitable distance.

The finely-divided solids and the granular solids preferably are intimately mixed in proportions to form a mass which can be fluidized by the injection of gases and transported in a fluid-like condition. The relative proportions of the fines and granules needed to produce a fluidizable mixture necessarily depends on the particle size and distribution of sizes of the fines and granules. As a general rule, the more coarse the granules the larger is the proportion of fines needed. Simple experimentation with any given granular material and the available fines will indicate the proportions needed to produce a fluidizable mass. As an example, a granular mass of 2–3 millimeters particle size requires about one part of fines of 10–40 micron particle sizes for each four parts by weight of the granules to produce a fluidizable mixture, the density of the fines and granules being about the same.

In the further description of the invention the contact material of relatively large particle size employed in a downwardly moving contact bed is referred to as "granular" or "relatively coarse," while the finely divided material mixed therewith for upward transport is referred to as "powder" or "finely divided solids" or "fines."

Preferably, pipe 20 is substantially elongated below the point of introduction of powder from line 21 whereby the resulting mixture of powder and granules may be flowed downwardly as a substantially elongated column of aerated and/or fluidized solids. If necessary, aerating gas, such as steam or other inert gas, may be introduced into pipe 20 from lines 23 and 24. A solids flow control valve 25 is provided in line 20 at a low point to control the rate of discharge of solids from the lower end of pipe 20. Valve 25 is located near the lower end of pipe 20 in order to develop the maximum pressure at the inlet of valve 25, resulting from the "stand-pipe" effect of the column of aerated solids in pipe 20 and the pressure imposed at the top of pipe 20.

The development of pressure by means of stand-pipe 20 is not essential to the operation of the process, which may be carried out without any such pressure generation. In any case, however, valve 25, or a similar solids flow control device, preferably is located below the point of mixing of the powder from line 21 with the granular solids. By this arrangement the solids whose flow rate is to be regulated by valve 25 are supplied to the entrance of the valve as components of an aerated, readily flowable, solids mixture which passes through the valve at a uniform rate at any setting of the valve. By this means satisfactory and flexible control of the rate of withdrawal of granular solids from chamber 10, by suitable manipulation of control valve 25, is made possible.

Below valve 25, line 20 connects with an upflow transfer line 26, in which the aerated mixture of powder and granular solids is lifted to a high point from which the granular solids may be again flowed into the top of chamber 10 through line 15. The operation of lifting of the granular solids to a more elevated point by gas transport of the aerated mixture in line 26 may be combined with a treatment of the granular solids to condition them for further use in chamber 10. The conditioning treatment may be effected by the gas employed as the transport medium, or by heating or cooling applied from an external source. In many of the processes to which this invention is applicable the treatment of the vapors in chamber 10 results in the deposition of non-gaseous materials on the granular solids, which materials should be removed prior to repassage of the granular solids through chamber 10. For example, in hydrocarbon conversion treatments the granular solids, which may be catalyst, acquire in chamber 10 deposits of carbonaceous materials which lessen their effectiveness in the hydrocarbon conversion operation. Conveniently, these deposits may be burned from the surface of the granules during passage of the mixture of powder and granules upwardly through line 26. For this purpose, air, or a mixture of air and inert gas, is supplied to line 26 at the lower end thereof. The quantity of the total gas is sufficient to transport the solids and the quantity of oxygen supplied is effective to burn the carbon, during passage of the solids through line 26, to the desired extent without exceeding any maximum safe regeneration temperature. The hydrocarbon treatments, such as catalytic cracking, which may be carried out in chamber 10, involve the use of temperatures sufficiently high that the carbonaceous deposits on the granules issuing from valve 25 are sufficiently hot to become ignited on contact with oxygen passing through line 26.

The quantity of fines circulated in the system, in relation to the quantity of granular solids circulated through the contact zone, depends in part upon the relative sizes of the particles of fines and granules and the maximum carrier gas velocity which it is desired to employ in line 26. When granular material having a particle size of 0.5 to 10 millimeters is to be transported upwardly in a gas lift line, such as line 26, the maximum loading of solids in the gas is approximately 0.5 to 2.0 pounds per cubic foot, and this at gas velocities of 20 to 50 feet per second in line 26. By the admixture of fines having particle sizes of 1 to 100 microns, the gas velocity in line 26 may be substantially reduced, while still maintaining uniform flow conditions, to the range of 5 to 20 feet per second, with solids loadings in the gas stream as high as 10 pounds per cubic foot. The proportions, by weight, of fines to granular solids necessary to achieve the desired reduction in velocity and increase in solids loadings depends on a variety of specific conditions, such as the relative densities of the solid and the gas at the operating conditions, the viscosity of the gas, the relative proportion and density of the fines and granules, and the maximum particle size of the granules. For example, when employing air at atmospheric pressure to lift granular material having a particle size of 2 to 3 millimeters, it is sufficient to employ a proportion of one part by weight of fines having a particle size of 10 to 40 microns to 4 parts by weight of the granular material. The addition of this proportion of fines, similar in density to the granules, substantially reduces the velocity necessary to lift the granules, with a concurrent substantial increase in the solids loading of the gas stream, this in turn reducing the quantity of gas necessary to lift a given quantity of the granular material. The reduction in the minimum velocity also reduces the erosive effect of the solids on the carrier line and reduces the rate of attrition of the granular material.

The gas stream may be passed through line 26 at a substantially uniform velocity, from bottom to top, to maintain the upflowing solids as a relatively dilute suspension or as a relatively dense aerated mass. Alternatively, the velocity may be high in one or more portions of line 26, with corresponding dilution of the suspension, and relatively low in one or more different parts of line 26, in which the density is thus maintained relatively high. For example, the gas stream may be passed upwardly in the lower portion of line 26 at a relatively high velocity to an intermediate enlarged portion in which the velocity is substantially decreased to cause an accumulation of the solids in a relatively dense condition. By this means, the residence time of the granules in line 26 is increased to any amount necessary to carry out the regeneration or revivification treatment. The intermediate enlarged portion of line 26 may be enclosed by a jacket 27 provided with lines 28 and 29 for circulating cooling, or heating, fluids in indirect heat exchange with the enlarged portion of line 26.

The upper end of line 26 terminates in a separating vessel 30. Preferably, the upper end of line 26 is curved downwardly whereby the mixture of solids and carrier gas is discharged into separator 30 in a downward direction.

Separator 30 is divided by a vertical partition 31 which sets off a portion of vessel 30 as a reservoir 32 for the collection and accumulation of the relatively coarse granular material which it is desired to repass through chamber 10. Preferably, the exit end of line 26 extends downwardly in vessel 30 and in reservoir 32 to a point substantially below the upper edge of partition 31. The cross sectional area of reservoir 32 is such that the gas emerging from line 26 assumes an upward velocity which is sufficient to carry upwardly and over partition 31 the fine particles of solid material constituting the powder which it is desired to exclude from chamber 10. By maintaining an upward gas velocity of, for example, 3 to 15 feet per second in reservoir 32, the granular material is permitted to settle to the bottom of the reservoir, while powder is carried overhead in suspension. The exact velocity needed here depends partly on the gas viscosity and density at the conditions in vessel 32.

The separation of fines and granular material in reservoir 32 may not be sufficiently complete whereby an excessive quantity of fines is included in the settled mass of granules. To avoid this result, it is desirable to provide for means for elutriating the settled granular mass in reservoir 32. For this purpose, air, or other gas may be introduced through a suitable distributor from line 33 at a point somewhat below the level 34 of the mass of granular solids. The gas introduced from line 33 strips the granular mass of fines and at the same time increases the upward velocity of gas above the level 34 of the granular bed, thus inhibiting the settling of fines. The elutriation of the solids in reservoir 32 may be carried out in conjunction with further treatment of the granules to effect regeneration or revivification thereof. For example, air introduced through line 33 may be employed to effect further burning of carbonaceous deposits on the surface of the granules. For this purpose, it may be desired to preheat the air supplied in line 33 to maintain combustion. It may be desirable, also, to strip the granular mass of combustion products prior to introducing the solids into chamber 10. For this purpose, an inert gas, such as steam, may be introduced from line 35 into reservoir 32 at a low point.

The granular solids collected in reservoir 32 are withdrawn therefrom through line 15 which connects with vessel 30 at the bottom of reservoir 32. To facilitate the flow of the granular solids through line 15, it is desirable to locate vessel 30 with reservoir 32 substantially directly above chamber 10, whereby line 15 does not deviate substantially from the vertical in any part of its length.

In separating vessel 30, the gas stream flowing from reservoir 32 over partition 31 is directed downwardly and at decreased velocity as it enters the part of vessel 30 outside reservoir 32. The velocity preferably is reduced sufficiently to permit settling of by far the greater part of the fines previously carried in suspension in the gas stream. Such fines collect in the bottom of vessel 30 and are maintained therein in a dense fluidized condition by the introduction of aerating and stripping gas at a low point, as from line 36. The aerated fines are maintained as a relatively dense mass in the bottom of vessel 30, having an upper level indicated at 37.

As it is impractical to effect satisfactorily complete separation of the fines by mere settling, mechanical means may be provided to assist in the recovery of unsettled fines. Such mechanical means may include settlers employing the cyclone principle, electrostatic precipitators, and filters. The use of such mechanical devices is well known to those skilled in this art, as are the means for recovering and returning the separated fines. The recovery of such fines, therefore, is indicated diagrammatically in Figure 1 by the provision of a cyclone separator 38. The gases from vessel 30 pass into cyclone 38 and out of it, and vessel 30, through line 39. The separated solids flow downwardly out of cyclone 38 through line 40 which may extend downwardly into the dense fluidized mass, as indicated in the drawing. Cyclone separator 38, or other mechanical separating means, may be located within vessel 30, as shown. It will be understood, however, that this is for convenience of construction only and that such separating means may be located outside of vessel 30 and connected thereto by suitable means.

The powder collected as a fluidized mass in the bottom of vessel 30 is withdrawn therefrom through line 21, through which the fines are transferred for reuse in the manner described above. Line 21 preferably does not deviate substantially from the vertical throughout its length, and the powder flowing downwardly therethrough is maintained in an aerated condition throughout in order to increase the pressure of the solids on the desired maximum at the entrance of valve 22. Aerating gas, such as steam, may be introduced through lines 41 at as many points as desired throughout the length of standpipe 21 to maintain the powder at the desired aerated condition and at the density necessary to effect the desired pressure increase.

In the operation of the process illustrated in Figure 1, the pressure maintained in the upper part of vessel 30 may be substantially the same as that of chamber 10, whereby the pressure on the solids flowing downwardly in standpipe 20 must be increased to the level necessary to compensate for the pressure drop through valve 25 and line 26. Under such circumstances, the duty imposed on standpipe 21 is merely that of increasing the pressure sufficiently to overcome the pressure drop through valve 22. If line 21 is connected to line 20 at a point substantially below the bottom of chamber 10, then the pressure at which the fines must be supplied to valve 22 is correspondingly increased.

The finely-divided solids, which comprise the powder mixed with the granular solids at the bottom of chamber 10 and separated therefrom in vessel 30, may be any suitable material. Conveniently, they may comprise, or consist of, relatively fine material of the same composition as the granular material in chamber 10. Some attrition of the granular material is inevitable and it may be that in operating runs of substantial length the fines which are circulated may come to consist substantially entirely of material formed from the granules by attrition. Unless filters are employed to assist in the separation of the fines from the gas passing through vessel 30, it may be desirable to provide means for adding fines to the system in an amount effective to balance the fines which were lost in the gas stream through incomplete separation in separators such as cyclones, etc. If filters are employed, it may be necessary, on the other hand, to provide means for removing a portion of the fines from the system to prevent an undue increase in the quantity thereof by attrition of the granular material. Suitable connections for these purposes, not shown, may be provided in connection with vessel 30. Likewise, means may be provided for adding granular solid material to the system to replace such granules as are lost by attrition.

While the operation of Figure 1 has been described by reference to contact treatments in general, the arrangement shown there is particularly applicable to the catalytic conversion of hydrocarbon oils, such as the cracking of high boiling hydrocarbon oils to form gasoline constituents. In such operation the hydrocarbon vapors, suitably preheated, if necessary, are introduced into the bottom of chamber 10 through line 13. The vapors emerge from distributor 12 and pass upwardly through the interstices of the granular mass, during which passage the hydrocarbons undergo the desired conversion reactions, such as cracking and isomerization. The cracked products emerge from the upper level of the catalyst bed at 18 and are withdrawn for further treatment through line 14. Preferably, the vapors are passed upwardly in chamber 10 at a velocity which is not high enough to agitate the bed or carry catalytic particles out of chamber 10 by suspension. If elutriation of the mixture of solids in reservoir 32 is effective and efficient, it is unnecessary to provide separating means, such as cyclones, to recover fines carried in suspension in the product vapors in line 14.

While the vapors may be passed upwardly through the granular mass in chamber 10, as indicated in Figure 1, to obtain the benefit of countercurrent contact with the catalyst mass, it may be desirable to flow the hydrocarbons downwardly through the catalyst mass. Suitable means for introducing the charge oil and recovering the product vapors in such an operation are known to those skilled in the art. This method of operation is particularly desirable in the conversion of relatively heavy, or residual, hydrocarbon oils which cannot be vaporized completely without decomposition. Such oils may be introduced wholly or partly in the liquid form into the top of chamber 10. They are vaporized by contact with the hot catalyst and the vapors then pass downwardly through the catalyst mass to the exit, during which passage they undergo further cracking. A description of this type of process may be found in a number of recent patents, such as for example Patent No. 2,429,545 issued on October 21, 1947 to Eric V. Bergstrom.

The catalyst employed in hydrocarbon conversions of Figure 1 may be any of the catalysts previously suggested for use in hydrocarbon conversions of the type carried out in chamber 10, such as the synthetic silica-gel-alumina and silica-magnesia complexes referred to above. The fine powder which is mixed with the catalyst at the bottom of chamber 10 and separated in reservoir 32 may be of the same composition as the granular catalyst, as pointed out above. However, when a relatively expensive catalyst is employed it may be desirable to employ as the powder a relatively inert, relatively inexpensive solid, such as crystalline, silica, clay, etc. Thus, any fines lost from the system through incomplete separation at 30 consist essentially of the relatively inexpensive material.

The spent catalyst, which has been stripped at 19, is mixed with the powder at the junction of line 21 with line 20 in the proportion of four parts by weight of granular material to one part by weight of fines. The mixture is then discharged through valve 25 into line 26 into a stream of air flowing upwardly through line 26 at a velocity of fifteen feet per second. Cooling may be carried out at 27 to remove heat of combustion which may be regenerated in excess of the amount which raises the temperature of the mixture from that at the junction of lines 20 and 26 to the maximum permissible temperature of regeneration. Ordinarily, however, the catalyst is circulated through the reaction zone in chamber 10 at a rate, in relation to the rate of charging hydrocarbon oil, such that the carbon to be burned in line 26 is not sufficient to overheat the catalyst, even without cooling at 27.

The fines assist in preventing undue rise in the temperature of the catalyst during regeneration by absorption of part of the heat of regeneration. This effect may be intensified by cooling the fines by suitable means not shown, prior to mixing them with the spent catalyst, or by the use of low temperature steam for stripping and aeration at 36 and 41. Ordinarily, however, it is desirable to recirculate the fines from vessel 30 to line 20 without unduly cooling them below the regeneration temperature. The hot fines thus recirculated may be employed to assist stripping hydrocarbons from the spent catalyst by introducing the hot fines into the bottom of chamber 10 below distributor 12, as described above. The presence of the fines in the mixture passing through heat exchanger 27 improves the efficiency of heat transfer, because of the higher permissible mass velocity without excessive erosion or attrition. Furthermore, the transfer of heat from particle to particle is more efficient in the mixture because of the presence of the fines.

The operation illustrated by Figure 1 is applicable to hydrocarbon conversion reactions in general, in which contact material becomes deactivated by the deposition of carbonaceous material which is removed by combustion in a separate zone. For example, catalytic cracking may be carried out by the introduction of hydrocarbon vapors at 13, with the regeneration of the catalyst being effected in line 26 by means of the oxygen employed in the gas stream. Likewise, the operation of Figure 1 may be applied to other hydrocarbon conversion operations, such as hydroforming, wherein the mixture of preheated naphtha and recirculated hydrogen-containing gas is introduced at 13 for passage upwardly through reactor 10 in countercurrent contact with the downwardly flowing catalyst mass. The rate of regeneration of catalyst in the hydroforming operation is affected largely by the pressure and quantity of hydrogen employed. For operations above 200 pounds per square inch the quantity of catalyst transferred through the regeneration zone in line 26 may be substantially lower than that employed in catalytic cracking. Likewise, in the hydroforming operation it may be desirable to recirculate a part of the flue gas from line 39 through line 36 to dilute the gas stream to a low oxygen content.

Figure 2:
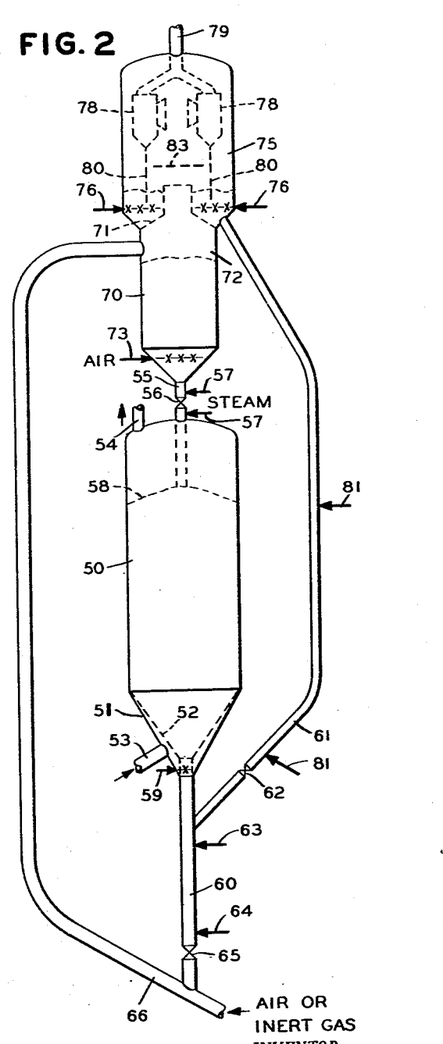
Figure 2 illustrates the modification of the invention, by diagrammatic representation in elevation, in apparatus in which two contact zones are arranged, one above the other, whereby the contact material flows by gravity out of the bottom of the upper contact zone into the top of the lower contact zone.

In the operation of Figure 1, the granular solids flow downwardly in chamber 10 as a substantially consolidated granular mass through which the vapors pass in the conventional manner, whereas the granular solids are carried upwardly in suspension in the regeneration zone in line 26. Figure 2 illustrates the embodiment of the invention in which the granular solids flow downwardly as a consolidated mass in each of two contact zones.

In Figure 2 a contact chamber 50 is provided, which chamber is arranged to operate substantially in the manner described above in connection with chamber 10 of Figure 1. Chamber 50 is provided with a lower conical portion 51 inside which there is located a conical perforated plate, or grid, 52, spaced from cone 50 to provide for distribution of the gas or vapor undergoing treatment to the perforation in cone 52. Perforated cone 52 supports the downwardly moving bed of granular material. The hydrocarbon vapor, or other gas or vapor undergoing treatment, is introduced into cone 50 through line 53. The vapors pass through porous cone 52 and upwardly through the granular bed to an upper exit at 54. The granular solids are introduced into chamber 50 through line 55 which is provided with a valve 56 and operates in the manner described above in connection with line 15. Sealing steam is introduced on either side of valve 56 through lines 57. The upper level of the bed of granular material is maintained a substantial distance below exit 54 to provide for effective separation of solids and gas, this level being indicated at 58. The solids in cone 52 are stripped of gas or vapors by means of stripping gas, such as steam, introduced through line 59. The stripping gas from line 59 may be introduced into the lower part of cone 52 at a point below the orifices in the cone 52, or may be introduced into the upper part of standpipe 60 into which the downwardly moving granular catalyst is directed by cone 52.

The fines or powder are introduced into admixture with the granular solids passing from the bottom of chamber 52, from line 61 which is provided with a control valve 62 and is arranged to deliver the fines into admixture with the coarse material in the same manner described in connection with line 21 of Figure 1. Line 61 may be connected with the lower part of vessel 50, or line 60, at any of the points discussed in connection with Figure 1, as the same considerations apply. The mixture of coarse and fine material flows downwardly through line 60, which may function as a standpipe in the manner described in connection with line 20 of Figure 1. Aerating gas, such as steam, may be introduced into line 60 from lines 63 and 64. The flow of the mixture out of the bottom of standpipe 60 is controlled by valve 65 and mixture thus released flows into line 66.

In line 66 the mixture of powder and granular material is suspended in a stream of air or inert gas and transported upwardly to a higher elevation. In the modification of the invention illustrated in Figure 2, it is desirable to transport the mixture upwardly in line 66 at a relatively high velocity, in the range of permissible velocities set forth above, particularly if air is employed as the transporting medium and if carbonaceous deposits are to be burned from the granular material.

Line 66 connects at its upper end with separating vessel 70 at an intermediate point thereof. Vessel 70 is enlarged with respect to line 66 whereby there is a substantial decrease in velocity. This permits the granular solid material to drop out of the gas stream and collect as a substantially consolidated granular mass in the lower portion of vessel 70. Air for revivification or regeneration is introduced into the bottom of vessel 70 through line 73 and this gas stream also elutriates the mass, whereby fines which tend to settle and accumulate in the granular mass are carried overhead in suspension.

Vessel 70 is divided, above line 66, into a lower section 72 and an upper section 75 by means of baffle 71, said baffle having a center orifice of restricted cross sectional area to provide a gas outlet from the lower section 72 to the upper section 75. The gases introduced into section 72 of vessel 70 and their reaction products pass upwardly through the opening in baffle 71 into section 75 of vessel 70. Section 75 of vessel 70 is larger in cross sectional area than the lower section of the vessel to effect settling of the major proportion of the finely-divided solid material. The fines thus separated by settling collect in the lower portion of section 75 of vessel 70 in a reservoir provided by pipe 82 which connects with the central opening in baffle 71 and extends upwardly therefrom a suitable distance. The settled solids collect in the space between pipe 82 and the outer walls of vessel 70 and are maintained therein in an aerated condition by the introduction of aerating gas, such as steam, through lines 76. The gases passing from the lower section 72 of vessel 70 pass through pipe 80 into the enlarged zone 75 in which the decrease in velocity permits settling of the fines. To assist in settling, a baffle 83 may be provided above pipe 82 to deflect solid particles from the path of flow of the gas.

The fines which are not settled in settling zones 75 may be recovered in any suitable manner, as described in connection with vessel 30 in Figure 1. For example, a plurality of cyclone separators 78 may be provided in the upper interior of the settling zone 75. The gases pass therethrough in parallel and are discharged for further handling through line 79. The fines separated in separator 78 are transferred through dip-legs 80 for admixture with the settled fines in zone 75.

The fines accumulated in the lower portion of settling zone 75 are withdrawn therefrom through line 61, the upper end of which connects with vessel 70 at the bottom of the reservoir provided in zone 75. The fines flow through line 61, which is arranged to function as a standpipe in the same manner as line 41 of Figure 1, and gas may be introduced to maintain the solids in line 61 in a flowable aerated condition at any desired points along the length of line 61, through lines 81.

The arrangement of Figure 2 differs from that of Figure 1 in certain obvious structural details, but principally in the provision for carrying out all, or a substantial part of, the regeneration or revivification treatment of the granular solids while the latter are flowing downwardly in the lower part of vessel 70 as a consolidated moving bed. By this means, the regeneration gases also serve to elutriate the mixture of granular solids and powder whereby the latter is efficiently separated from the granular material during regeneration treatment.

Figures 3–8 are simplified flow diagrams illustrating further modifications of the improved process. Parts of Figures 3–8 correspond in function and operation to certain parts of Figures 1 and 2, the corresponding parts being identified with the same reference numeral with the subscript $a$ or $b$. The description of these parts given in connection with Figures 1 and 2 applies also to the corresponding parts in Figures 3–8.

Figure 3:
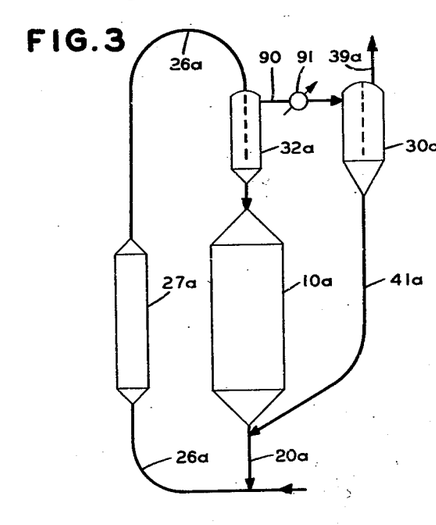
Figure 3 illustrates a further modification of the general system illustrated in Figure 1.

The arrangement of Figure 3 differs from that of Figure 1, which it closely resembles, in providing separate vessels 32a and 30a for separate recovery of the granular and powdered solids which are discharged from line 26a. The separated granular material then flows from vessel 32a into chamber 10a and the gas and unsettled fines flow from vessel 32a through line 90 into vessel 30a for separation and recovery of the fines. Cooling means are provided at 91 in line 90 whereby the heat of regeneration contained in the gas and the fines is largely recovered. The collected and cooled fines are returned for readmixture with the spent catalyst through line 41a and the cooled regeneration gases are withdrawn from the system through line 39a.

Figure 4:
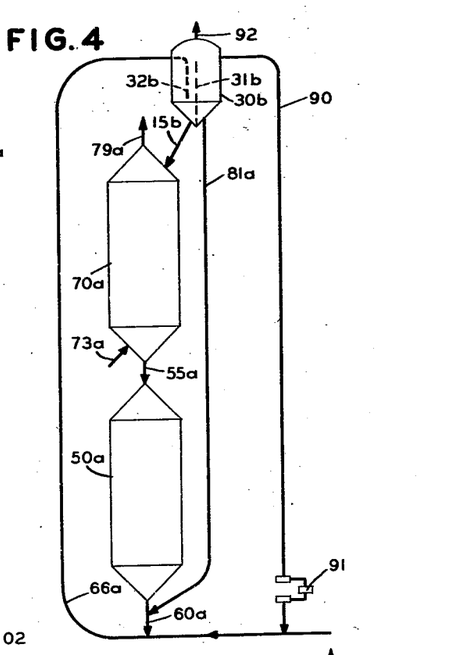
Figure 4 represents a further modification of the general system illustrated by Figure 2.

Figure 4 represents a variation of the procedure illustrated in Figure 2, in which chamber 50a is surmounted by a vessel 70a in which the granular solids are subjected to regeneration treatment by means of regeneration gas introduced at 73a and withdrawn at 79a. The mixture of spent and granular solids and fines transported upwardly through line 66a is discharged into a separating vessel 30b which is divided in two parts by a vertical baffle 31b and is arranged to separate and elutriate the granular material and fines in the manner described in connection with vessel 30 of Figure 1. The end of line 66a extends a substantial distance into reservoir 32b in which the granular material is separated and elutriated in the manner described in connection with reservoir 32 of Figure 1. The granular material thus seperated is discharge from the bottom of reservoir 32b through line 15b into the top of regenerating vessel 70a. Fines are separated from the gas on the opposite side of partition 31b and are withdrawn through line 81a which terminates in line 60a, whereby such fines are admixed with the granular material withdrawn from the bottom of chamber 50a. A portion of the gas containing residual fines is withdrawn from upper point in chamber 30b through line 90 and recirculated, by means of compressor 91, through line 66a, whereby it acts as the gaseous medium for transporting solids from the bottom of standpipe 60a into vessel 30b. Any gases which accumulate in the system are withdrawn through line 92 and are treated for recovery of fines contained therein. This modification differs from that of Figure 2 in that regeneration is conducted entirely outside the transport line 66a, whereby the gases which contain unsettled fines may be recirculated for reuse as the lifting medium.

Figure 5:
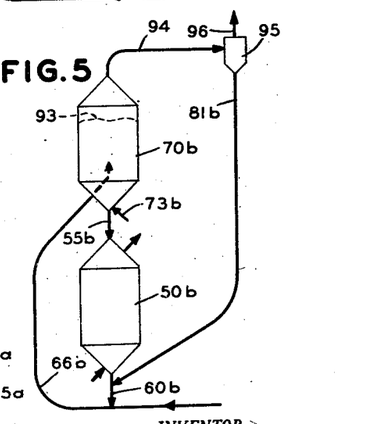
Figure 5 illustrates a system in which the granular solids are moved through a lower contact zone in the usual manner as a moving bed, but are maintained in the upper contact zone in an agitated, fluid-like, condition.

Figure 5 provides an arrangement similar to that of Figure 2, except that the mixture of powder and granules transported upwardly through line 66b discharges directly into a relatively dense fluidized mixture in the upper vessel 70b. The mixture of powder and granular material in vessel 70b is maintained as a dense fluidized mass in that portion of the vessel above the discharge end of line 66b, the upper level of the fluid bed being indicated at 93. The gases are flowed upwardly in vessel 70b above line 66b at a superficial velocity in the range of about 1 to 10 feet per second to maintain the mixture of solids in the desired dense fluidized condition. In the manner, the treatment of the solids, which may have been started during transportation thereof through line 66b, is completed in the dense phase in vessel 70b. The relatively coarse granular material tends to settle in vessel 70b below the outlet of line 66b and is permitted to collect in the lower portion thereof. Additional gas, which may be additional regenerating gas, is introduced into the lower part of vessel 70b through line 73b. The gas containing suspended fines flows out of vessel 70b through line 94 into a separator 95 in which the fines are separated from gas which is withdrawn through line 96. The fines thus recovered are returned to line 66b through line 81b. The arrangement of Figure 5 differs from that of Figures 1 to 4 in that it provides for a moving bed of granular contact material in one contact zone and a dense fluidized bed of contact material in the other contact zone.

Figure 6:
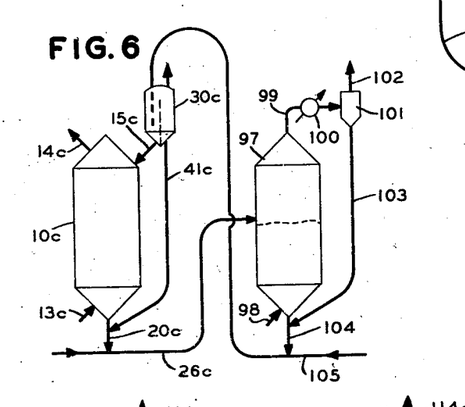
Figure 6 illustrates a side-by-side arrangement of two contact zones employing the principle of the invention.

Figure 6 illustrates an arrangement in which the contact vessels may be placed side by side. Contact vessel 10c receives granular contact material through line 15c from separating and elutriating vessel 30c. The fines separated in vessel 30c are transported through standpipe 41c to admixture with the granular solids in line 20c. The mixture of granular and powdered solids is discharged from line 20c into transport line 26c which discharges into another contact vessel 97 at an intermediate point thereof. In vessel 97 the mixture of powder and granular material is permitted to separate and the granular material flows downwardly as a moving bed in countercurrent contact with a treating gas introduced at a low point from line 98. The treating gas flows upwardly through the moving bed of granular material, contacting the solids and at the same time elutriating the mass to separate and carry overhead the relatively fine particles. The gases introduced into vessel 97 pass overhead through line 99 which may be provided with cooling means 100. Line 99 discharges into a separating vessel 101 in which the suspended powder is separated and recovered. The gas is withdrawn through line 102 and the fines are transported through standpipe 103 to line 104, into which the granular solids are discharged from the bottom of vessel 97. The granular contact material and powder are thus readmixed in line 104 and discharged therefrom into line 105. In line 105 the mixture of solids is suspended in a gas stream, such as steam. The mixture of solids is transported in suspension in the gas stream through line 105 and discharged into vessel 30c in the manner described in connection with line 26 of Figure 1.

Figure 6 illustrates a side by side arrangement of a pair of contact vessels in each of which the granular contact material flows downwardly as a substantially consolidated moving mass. Figure 6 also illustrates, in connection with vessel 27, an arrangement in which the separation of fines and granular material is effected in the upper part of a chamber containing a downwardly moving mass of the granules. The latter method of separation could be applied, also, to the other side of the operation, in connection wtih vessel 10c.

Figure 7:
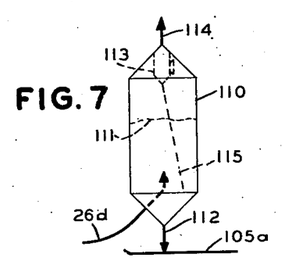
Figures 7 and 8 represent modifications of Figure 6 as applied to one of the contact zones.

Figure 7 illustrates a variation of Figure 6 wherein the mixture of powder and granular solids is discharged from line 26d into a lower intermediate part of a contact vessel 110 whereby a fluidized bed of the solids mixture, having an upper level indicated at 111, is maintained above the discharge end of line 26d. A mixture of coarse and fine particles is withdrawn from the bottom of vessel 110 through line 112 for discharge into transport line 105a, whose operation may be identical with that of 105 in Figure 6. The fines carried out of the bed in vessel 110 are separated in a cyclone separator 113, located in the upper portion of vessel 110, and the gas stream from the separator 113 is withdrawn therefrom, and from vessel 110, through line 114. The fines recovered in separator 113 are returned through a dip leg 150 which terminates in the dense bed, preferably at a point below the exit of line 26d, whereby the recovered fines are mixed directly with the outgoing mixture of powder and granules in the bottom of vessel 110. The arrangement of Figure 7 differs from that of Figure 6 in that the mixture of granules and fines is introduced into vessel 110 from line 26d in suspension in the gas or vapor with which the granules are to be contacted in vessel 110, such contact being effected in a dense fluidized bed rather than in the downwardly moving bed of the granules as in vessel 97.

Figure 8:
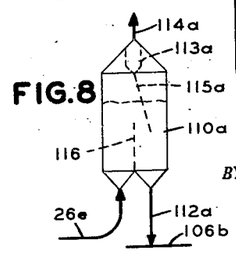

Figure 8 illustrates a variation of the arrangement of Figure 7 in which the mixture of powder and granular material is discharged through line 26e into a low point of vessel 110a. The resulting relatively dense fluidized mixture flows over a central vertical baffle 116 and is withdrawn through line 112 for discharge into line 106b. The fines recovered in separator 113a are returned through dip-leg 115a which terminates on the down-flow side of partition 116. The operation of Figure 8 is otherwise the same as that of Figure 7, corresponding parts being identified by the same reference numeral with the subscript a.

In each of the specific modifications of the invention which have been described above, a zone through which have been described above, a zone through which a bed of the granular contact material moves downwardly has been designated as a treating or reaction zone, while any regeneration or revivification, or other treatment of the granular contact material to condition it for further contact with the gas or vapor in the treating or reaction zone, is provided for in a second contact zone in which the granular material may, or may not, be maintained as a downwardly moving bed. However, in each of the specific modifications so far described, the functions of the two contact zones may be exchanged. In each of the modifications illustrated in Figures 1 to 8, either of the contact zones may be used for regeneration, etc., or for reaction, etc. Figure 1 has been described as a system in which reaction or other treatment is carried out in chamber 10, while regeneration or revivification of the contact materials is carried out in line 26. Alternative to this arrangement, chamber 10 may be employed as a regeneration chamber, while the reaction or other treatment may be carried out in line 26. This may be highly advantageous if it is necessary to reduce the carbonaceous content of the contact material to a very low percentage. Likewise, in the arrangement of Figure 2 chamber 50 may become the regeneration zone while chamber 70 becomes a reaction zone. The difference in this arrangement is largely in connection with the recovery of the fines from the reaction products rather than from the regeneration gas, since the granular material moves through both zones as a downwardly moving bed. The same conclusions apply also to Figures 5 to 8. The arrangement of Figure 4 ordinarily will require always employing chamber 70a as a revivification or regeneration zone, as it would be undesirable to recycle reaction products through line 90.

In certain modifications of the invention described above the granular contact material is circulated through separate contacting and regeneration or revivification zones. The invention is also applicable to operations wherein the granular contact material is subjected to two treatments in a single zone, such as successive adsorption and desorption treatments. This method of operation is illustrated in Figure 9, which shows diagrammatically in elevation an arrangement of apparatus suitable for applying the invention to the treatment of gases such as natural gas.

Figures 9, 10:
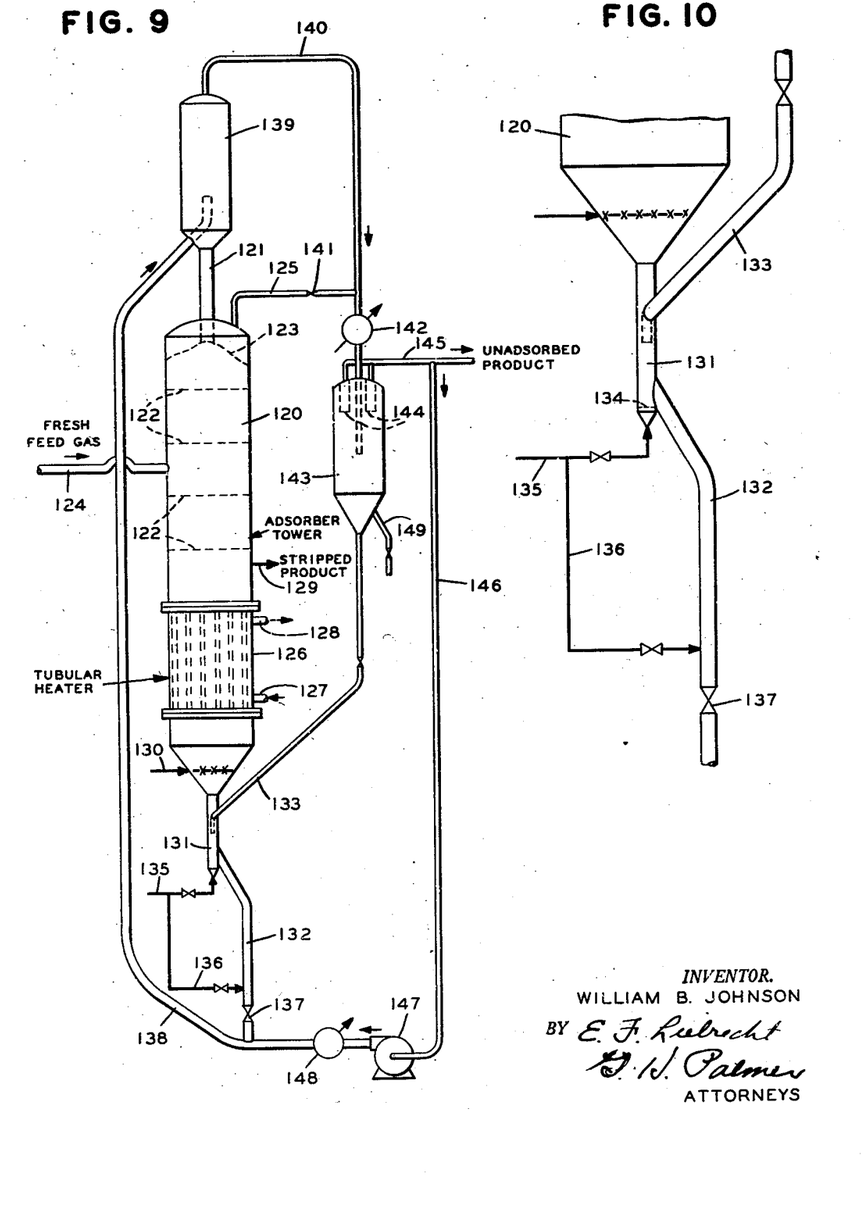
Figure 9 represents in diagrammatic elevation a contact system for adsorption treatment of a gas, such as natural gas.
Figure 10 is an enlargement of a portion of Figure 9 to show in more detail means for carrying out a feature of the invention.

In Figure 9 a vertical treating tower 120 is provided to receive at the top, through line 121, an intermittent or continuous supply of granular adsorbent material, such as charcoal. The charcoal thus supplied is substantially free of adsorbed hydrocarbons and is at a temperature suitable for the adsorption treatment of the natural gas. The charcoal granules flow downwardly through vessel 120 as a substantially compact or consolidated moving mass, providing interstices for the flow of gas therethrough. Distributor grids 122 may be provided at desired intervals along the length of vessel 120 to assist in distributing the flow of the granules and the gases. Line 121 preferably extends downwardly into vessel 120 for a distance sufficient to locate the upper level of the bed of granules, indicated at 123, below the top of vessel 120, to provide a disengaging space.

The natural gas feed, containing approximately 25% $C_3$ and $C_4$ hydrocarbons (propane, butane, etc.) is introduced at an intermediate point of tower 120, from line 124, located sufficiently below the upper level of the charcoal bed to provide the required degree of contact of the gas with the charcoal while the gas passes upwardly in countercurrent contact with the charcoal bed from line 124 to outlet line 125, which connects with the top of tower 120 above the bed of charcoal.

The fresh feed gas is introduced at a temperature suitable for the desired adsorption effect. Best results are obtained by maintaining a low temperature in the zone between line 124 and line 121, equivalent to a gas outlet temperature of about 100° F. Cooling means, not shown, may be provided in that zone if the gas and charcoal charged are not sufficiently cool to effect the desired cooling of the adsorption zone. This results in a substantial adsorption of the gas, including constituents lighter than the desired $C_3$ and $C_4$ product. At a low point in vessel 120 the charcoal-containing adsorbed hydrocarbons pass through a zone of high temperature, which may be provided by incorporating a tubular heater 126 as an integral part of vessel 120. A heating fluid, such as steam, is introduced at 127 and withdrawn at 128. In flowing through tubular heater 126, the charcoal granules are heated sufficiently to desorb the hydrocarbons adsorbed on the charcoal at a higher point in the tower. In the treatment of natural gas to adsorb $C_3$ and $C_4$ hydrocarbons, this normally requires heating the enriched granules to a temperature of about 400° F. The desorbed vapors rise upwardly through the descending mass of charcoal and are withdrawn in part as a product of the process through line 129, which connects with tower 120 at a point intermediate tubular heater 126 and feed line 124. The adsorbed gases which flow upwardly through the descending mass of charcoal between line 129 and line 124 serve to heat the downwardly flowing enriched granules above the temperature of adsorption, thus effecting a preliminary selective desorption treatment of the enriched granules. At the same time, the desorbed gases are cooled by contact with the enriched granules and the higher boiling components thereof are readsorbed by the granules.

The granular charcoal emerging from the lower end of tubular heater 126, and substantially denuded of adsorbed hydrocarbons, flows through the lower section of tower 127 in which they are subjected to the action of a stripping gas, such as steam or light hydrocarbon gas introduced from line 130. A part of the stripping gas is permitted to flow downwardly with the charcoal granules into standpipe 131 and thus act as a seal.

Standpipe 131 connects with lower conical section of vessel 120 and serves as the line for withdrawing the granular material from the tower preparatory to returning it to the top of the tower for reuse. The withdrawn granular material flows downwardly through line 131 and into a second standpipe 132 which connects diagonally with line 131 at a point just above the lower end of the latter.

Charcoal fines are introduced into line 131 from line 133. Line 133 enters line 131 diagonally and terminates in the center of line 131. This is shown in more detail in Figure 10, which is a detailed representation of the lower portion of Figure 9 and in which the same reference numerals are employed. Aerating gas is introduced into the bottom of line 131 and is distributed through a porous plate 134 located in line 131 at the bottom of the junction of the latter with line 132. The aerating gas introduced from line 135 serves to agitate the mixture of fines and granules in line 131 to obtain intimate mixing and to form a fluidizable mass of the granules and fines, which then flows into and down through standpipe 132. Line 133 preferably is connected to line 131 at an intermediate point, so that there is a substantial length of line 131 above the junction with line 133 to permit the circulation of the fines in forming the intimate mixture. A portion of the aerating gas, which in this case may be a light hydrocarbon gas, such as the unadsorbed product of the process, may be permitted to flow upwardly into vessel 120 to serve as the stripping gas, in place of the gas introduced through line 130. Additional aerating gas may be introduced directly into standpipe 132, from line 136, at one or more points above the control slide valve 137.

The mixture of granular and powdered charcoal flows through valve 137 out of the lower end of standpipe 132 and into gas lift line 138. In line 138 the mixture is transported upwardly in the manner described in connection with the similar portions of Figures 1–8, to a high point above the top of vessel 120. Line 138 terminates in elutriating vessel 139 which is designed to permit a reduction in velocity in the gas stream to effect settling of the granular material while the gas and fines pass overhead through line 140. The discharge point of line 138 is located a substantial distance above the bottom of vessel 139 to permit the accumulation of settled granular material, which then flows downwardly as a consolidated granular mass into line 121 for transfer into vessel 120, as described above.

The separation of powder and granular material in vessel 139 need not be perfect, since any fines which settle with the granular material and flow downwardly into vessel 120 are stripped out of the granular mass by the feed gas being treated and are carried in suspension in the unadsorbed product gas out of the vessel 120 through line 125. The fines-containing gas flowing through line 140 conveniently is combined with that from line 125, a valve 141 being provided in line 125 to permit pressure equalization. The combined gas streams then flow through a cooler 142 prior to discharge into a fines hopper 143.

In hopper 143 the gas velocity is substantially reduced to permit settling of the charcoal fines. The gas is withdrawn at the top of hopper 143 through filter elements 144 or other suitable solids separating devices. The settled fines are withdrawn from the bottom of hopper 143 through standpipe 133 for discharge into line 131, in the manner described above. Excess fines formed by attrition are withdrawn from hopper 143 through line 149. Line 133 may be aerated by gas injection at desired points to maintain the fines as a fluidized column.

The unadsorbed product gas is withdrawn from the top of hopper 143 through line 145. A portion of this gas is diverted through line 146 and returned for reuse in the process as lift gas, by connecting line 146 with the inlet of recycle gas blower 147. Blower 147 discharges recycle gas into line 138 for use in the manner described.

In this embodiment of the invention the charcoal fines have the additional function of cooling the granular charcoal which has been heated to a temperature of about 400° F. The heat thus adsorbed from the granular charcoal is withdrawn in the cooling step carried out at 142. In addition, a cooler 148 is interposed in line 138 at the exit of blower 147 to remove the heat of compression whereby the lift gas is supplied at a low temperature, and serves also to abstract heat from the granular charcoal. Likewise, the aerating gas introduced at 130, 135 and 136 assists in cooling the granular charcoal from the temperature of 400° F. to a temperature preferably not substantially higher than 100° F., at which it should be supplied to the adsorption step. If the quantity of fines circulated for the purposes described above is not sufficient to cool the granular to the desired extent, the quantity circulated may be increased to provide the necessary cooling. Cooling is effected, also, by desorption which occurs in line 138 as the granules pass to lower pressure.

In all the modifications of the invention described above and illustrated by Figures 1 to 10, the fines serve to agitate the granules at constricted points of flow to prevent bridging of the granular mass. The addition of the fines also permits fluidizing the mixture of fines and granular solids so that a column of the resulting mixture may provide a fluid head seal between zones and also make possible uniform control of the solids flow rate between zones. The fines also assist the gas in carrying large granules in suspension from one zone to the other at low velocities and high solids loadings to reduce the erosion of the carrier lines and attrition of the granules. The improvement of the flow characteristics of the mixture by the incorporation of the fines increases the heat transfer rate when it is desired to heat or cool the solids stream, this being due to the higher allowable mass velocity and improved particle to particle and particle to wall contact.

In all of the modifications described above the granular solids are withdrawn from the bottom of the contact zone and transferred to a carrier line through a standpipe, such as line 20 in Figure 1, line 60 in Figure 2 and lines 131 and 132 in Figure 9. Such standpipes provide a seal between the high pressure required in the carrier line and the lower pressure in the bottom of the contact vessel. It should be understood, however, that the invention is not limited in its application to operations employing such standpipe seals, but is applicable, with advantage, to operations in which it is unnecessary to maintain a higher pressure in the gas lift line than in the bottom of the contact vessel from which the granular solids are withdrawn, so that no standpipe is needed. Furthermore, the invention may be applied with advantage to operations wherein the standpipes, as shown in Figures 1 to 9, are replaced with solids pumps such as those described in detail in U. S. Patents 1,553,539 and 2,102,330.

I claim:

1. In a cyclic method of contacting a gas with granular solid material comprising predominantly solids having an average diameter of about 0.5 mm. to about 10 mm. by flowing said gas through the interstices of a mass of granules of said solids in a contact zone, withdrawing granular contact material from contact with said gas at a low point in said contact zone and returning said granular contact material to a high point in said contact zone, the improvement which comprises, mixing said withdrawn granular solid material with a relatively more finely-divided solid material of substantially smaller average particle size than said granular solid in sufficient amount to form a fluidizable mixture, passing said mixed solids into a second gas to form a fluidized suspension of said mixed solids in said gas, passing said suspenion to an elevated point, separating said granular solids from said second gas and said more finely-divided solid material at an elevated point, and discharging said last-mentioned separated granular solid at an elevated point into a contact zone wherein said granular solids are contacted with a gas in the absence of said finely divided solid material.

2. In a cyclic process comprising the contacting of a gas with a granular solid material comprising predominantly solids having an average diameter of about 0.5 mm. to about 10 mm. by flowing said gas through the interstices of a mass of granules of said solid in a contact zone, withdrawing granular contact material from contact with said gas at a low point in said contact zone, passing said withdrawn granular material to an elevated point above said contact zone and introducing said granular material into said contact zone, the improvement which comprises passing said withdrawn granular material to said elevated point by mixing it with a relatively more finely-divided solid material of substantially smaller average particle size in sufficient amount to form a fluidizable mixture, introducing said mixture into a second gas to form a suspension of said mixture in said gas, passing the mixed solids in suspension in said second gas upwardly to said elevated point, and separating said granular solids from said second gas and said more finely-divided solid material at said elevated point for the passage of said granular solids through said contact zone in the absence of said finely divided solid material.

3. The method of claim 1 wherein the mixture of granular solids and more finely-divided solid material is passed downwardly as an aerated suspension to a zone of higher pressure prior to discharge of the mixture into said second gas to form said suspension of mixed solids.

4. The method of claim 1 wherein the granular solids emerging from said contact zone flow through a flow control orifice and the said more finely-divided solid material is admixed with said granular solids prior to passage thereof through said flow control orifice.

5. The method of claim 1 wherein the granular contact material withdrawn from contact with the first mentioned gas in said contact zone is subjected to stripping by means of a stripping gas to separate said first mentioned gas therefrom prior to admixture of said more finely-divided solid material with said granular contact material.

6. The method of claim 1 wherein said granular contact material comprises catalytic material, and wherein said more finely-divided solid material is relatively more inert in respect to catalytic activity.

7. The method of claim 1 wherein finely-divided solid material separated from said granular solids at said elevated point is re-admixed with other granular solid withdrawn from contact with said gas at said low point.

8. In a cyclic method for carrying out a chemical reaction in the presence of granular contact material in a reaction zone which comprises flowing said granular contact material comprising predominantly solids having an average diameter of about 0.5 mm. to about 10 mm. downwardly through said reaction zone as a moving bed, passing a gaseous reactant through said bed, withdrawing said contact material from contact with said reactant at a low point in said contact zone and returning said contact material to a high point in said contact zone, the improvement which comprises, mixing said withdrawn granular contact material with more finely-divided solid material of substantially smaller average particle size than said granular material in such proportions as to form a fluidizable mass, forming a suspension of the resulting solids mixture in a gas stream, flowing the resulting suspension upwardly through a regeneration zone, withdrawing the suspension from the regeneration zone at a high point thereof, separating said granular solids from said suspension and from said more finely-divided solid material at a point higher than said reaction zone, and discharging the separated granular solid material into said reaction zone wherein said granular solids are contacted with said gaseous reactant in the absence of said finely divided solid material.

9. In a cyclic process for carrying out chemical reactions in the presence of granular solid contact material comprising predominantly solids having an average diameter of about 0.5 mm. to about 10 mm. wherein the contact material flows downwardly through one contact zone as a moving bed, is carried upwardly through a second zone in suspension in a gas stream, and thereafter is repassed through said first-mentioned contact zone, the improvement which comprises admixing with the granular contact material a sufficient amount of more finely-divided solid material of substantially smaller average particle size to form a fluidizable mass prior to passage of the granular contact material upwardly through said second zone, and separating the said more finely-divided solid material from the granular contact material before repassage of the latter through the first-mentioned contact zone.

10. In a cyclic method for carrying out a chemical reaction wherein solid granular contact material comprising predominantly solids having an average diameter of about 0.5 mm. to about 10 mm. is contacted with reactants in one contact zone and subjected to regeneration treatment in another contact zone, the said contact zones being located one above the other whereby the granular contact material flows by gravity first through the upper zone and then through the lower zone, the improvement which comprises admixing with the granular contact material emerging from the lower contact zone more finely-divided solid material of substantially smaller average particle size than said solid granular material in such proportions as to form a fluidizable mass, transporting the resulting mixture in suspension in a gas stream upwardly to a point above the upper contact zone, separating said granular solids from said gas stream and said more finely-divided solid material at a point higher than said upper contact zone and discharging said last-mentioned separated granular solid material into said upper contact zone.

11. In a cyclic method for contacting a gas with granular solid adsorbent material to effect adsorption of higher boiling constituents of said gas by said solid, which comprises flowing a consolidated granular mass of said granules comprising predominantly solids having an average diameter of about 0.5 mm. to about 10 mm. downwardly through adsorption and desorption zones, passing said gas through that portion of the granular mass traversing said adsorption zone at a relatively low temperature to effect adsorption of a substantial proportion of said high boiling constituents of said gas, thereafter flowing the enriched granular material through said desorption zone, heating the granular material in said desorption zone to desorb said high boiling constituents of said gas, and withdrawing desorbed constituents of said gas separately as a product of the process, the improvement which comprises withdrawing said granular material from the desorption zone, mixing said withdrawn granular material with a sufficient amount of relatively more finely-divided solid material of a substantially smaller particle size than said granular material to form a fluidizable mixture, and passing said mixture into a second gas stream to form a suspension of said mixed solids in said second gas stream, passing said suspension to a point above said adsorption zone, separating said granular solids from said second gas and more finely-divided solid material at said elevated point and discharging said last-mentioned separated granular material into said adsorption zone wherein said first-named gas is contacted with said granular material in the absence of said finely divided solid material.

12. The method of claim 11 wherein said second gas stream, after separation of said granular material at said elevated point, and the finely-divided solid material remaining in suspension therein, are cooled, after which the finely-divided solid material is separated from the second gas stream and remixed with granular solid material emerging from the desorption zone.

13. The method of claim 12 wherein said second gas stream and unadsorbed gas flowing out of said adsorption zone are combined for passage to said cooling step.

14. The method of claim 1 wherein the bulk of the granular solid material ranges in particle size from 2 to 3 mm., the bulk of the more finely divided solid material ranges in particle size from 10 to 40 microns and about 1 part by weight of the more finely divided solid material is mixed with each 4 parts of granular material.

15. The method of claim 2 wherein the bulk of the granular solid material ranges in particle size from 2 to 3 mm., the bulk of the more finely divided solid material ranges in particle size from 10 to 40 microns and about 1 part by weight of the more finely divided solid material is mixed with each 4 parts of granular material.

16. The method of claim 8 wherein the bulk of the granular solid material ranges in particle size from 2 to 3 mm., the bulk of the more finely divided solid material ranges in particle size from 10 to 40 microns and about 1 part by weight of the more finely divided solid material is mixed with each 4 parts of granular material.

17. The method of claim 11 wherein the bulk of the granular solid material ranges in particle size from 2 to 3 mm., the bulk of the more finely divided solid material ranges in particle size from 10 to 40 microns and about 1 part by weight of the more finely divided solid material is mixed with each 4 parts of granular material.

References Cited in the file of this patent

UNITED STATES PATENTS

| | | |
|---|---|---|
| 1,825,707 | Wagner | Oct. 6, 1931 |
| 2,311,564 | Munday | Feb. 16, 1943 |
| 2,391,334 | Nicholson | Dec. 18, 1945 |
| 2,461,104 | Bates | Feb. 8, 1949 |
| 2,464,266 | Shand | Mar. 15, 1949 |
| 2,483,485 | Barr | Oct. 4, 1949 |
| 2,515,371 | Jewell | July 18, 1950 |
| 2,526,486 | Krebs | Oct. 17, 1950 |
| 2,535,140 | Kassel | Dec. 26, 1950 |
| 2,575,519 | Imhoff | Nov. 20, 1951 |
| 2,712,476 | Happel | July 5, 1955 |